United States Patent

[11] 3,618,643

[72] Inventors John A. Thomson
Havant;
James Carter, London, both of England
[21] Appl. No. 888,317
[22] Filed Dec. 29, 1969
[45] Patented Nov. 9, 1971
[73] Assignee Burmah Oil Trading Limited
London, England
[32] Priority Dec. 30, 1968
[33] Great Britain
[31] 61,676/68

[54] CONTAINER-FILLING APPARATUS
18 Claims, 6 Drawing Figs.
[52] U.S. Cl.................................................. 141/198,
137/101.25, 141/244, 141/302
[51] Int. Cl..................................................... B65b 1/30,
B65b 3/28, B67d 5/372
[50] Field of Search........................................141/100–105,
285–302, 234–248, 192–229;
137/101.25

[56] References Cited
UNITED STATES PATENTS
3,503,411 3/1970 Bauer et al.................... 137/101.25
Primary Examiner—Houston S. Bell, Jr.
Attorney—Stevens, Davis, Miller & Mosher ABSTRACT: A loading bay for filling the compartments of a vehicle with liquid fuel has a loading arm for each tank compartment. Each loading arm includes a nozzle and a solenoid operated shutoff valve for controlling the flow of liquid fuel through the nozzle, and is associated with a corresponding overfill protection device which is arranged to operate the shutoff device to prevent flow of liquid fuel through the nozzle when the level of liquid in the corresponding tank compartment reaches a predetermined maximum level. The overfill protection device has a normally open electric switch in series with a normally closed pressure operated electric switch and another normally open electric switch mounted on the loading arm. The normally closed pressure operated switch is positioned at one end of a tube which depends into the tank compartment with the other end open and lowermost when the overfill protection device is mounted on the tank vehicle during filling of the tank compartment and the two normally open switches are closed when the loading arm and the associated overfill protection device are positioned for a filling operation. The arrangement is such that liquid fuel is supplied to the tank compartment through the nozzle only when all three switches are closed and the action of liquid fuel in the tank compartment rising to the predetermined maximum level increases the pressure in the tube until the normally closed pressure operated switch is opened. The electric circuits including the switches of each overfill protection device and controlling the operation of the corresponding solenoid-operated shutoff valves are connected electrically in parallel so that operation of one overfill protection device to prevent the supply of further liquid fuel to the corresponding tank compartment has no influence on the supply of liquid fuel to the other tank compartments.

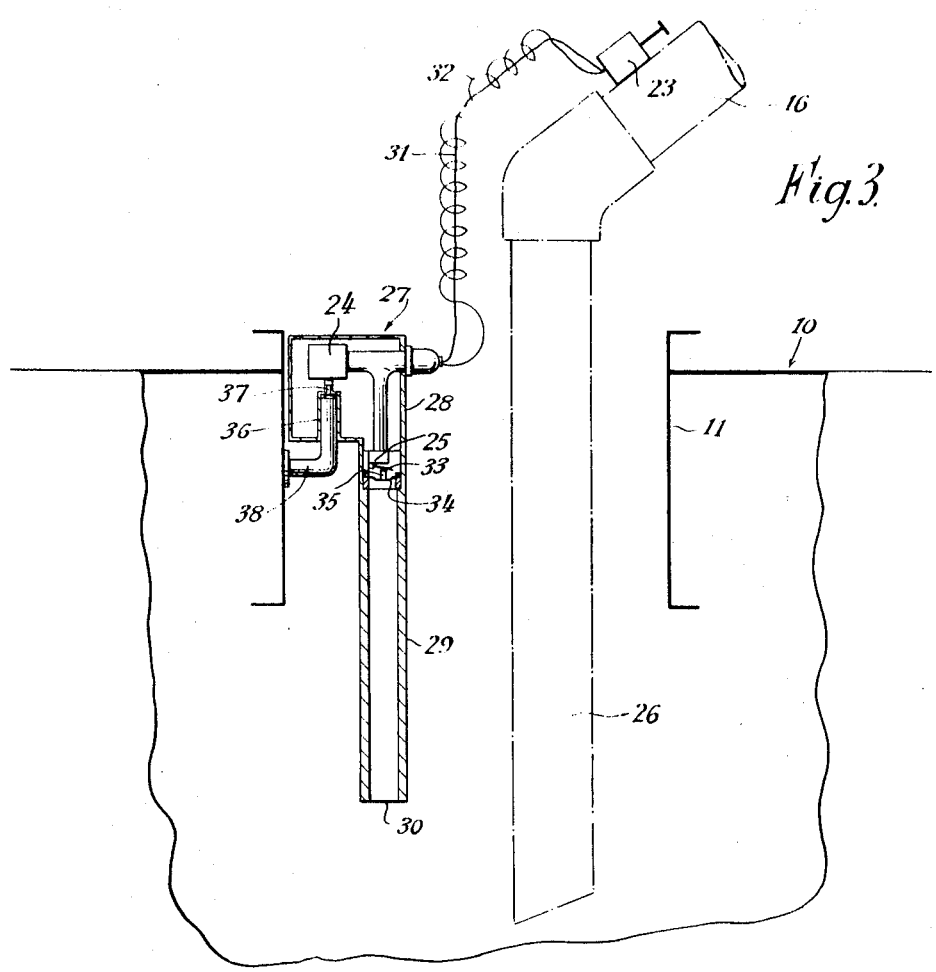

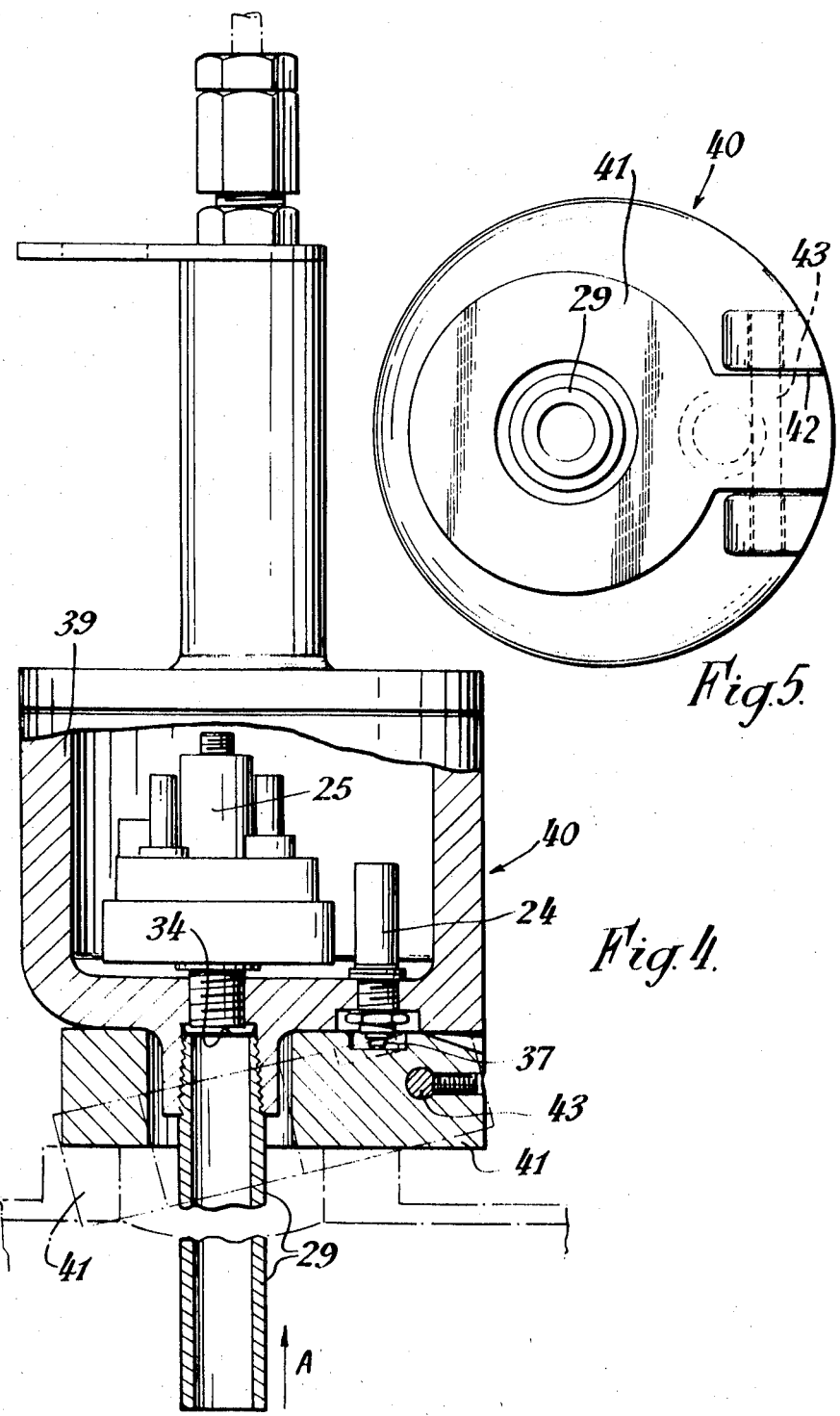

CONTAINER-FILLING APPARATUS

This invention relates to container-filling apparatus of the kind including a nozzle adapted to be inserted in a container to be filled, means for supplying liquid through said nozzle, and means for controlling the supply of liquid through said nozzle. A container-filling apparatus of the kind described is intended especially, but not exclusively, for filling a tank compartment of a tank vehicle such as is used for distributing liquid hydrocarbon fuels to points for retail sale or use. The invention is concerned with the prevention of overfilling of such containers so that spillage due to errors or inattention on the part of the person controlling a filling operation is prevented.

If a container-filling apparatus of the kind described includes an overfill protection device which is arranged to be used in combination with sensing means housed within a container to be filled so as to receive a signal from the sensing means when the level of liquid in the container being filled reaches a predetermined maximum level and for transmitting a signal accordingly to the means for controlling the supply of liquid through the nozzle of the container-filling apparatus of the kind described so as to shut off the supply of liquid to said nozzle, it will be appreciated that use of the overfill protection device to prevent overfilling of a container being filled by the container-filling apparatus of the kind described is restructed to use in combination with containers provided with such sensing means.

It is the object of the present invention to provide a container-filling apparatus of the kind described incorporating improved means for preventing overfilling of containers which may be used during an operation for filling any container and which are not restricted to use in combination with containers incorporating special sensing means.

According to one aspect of this invention there is provided container-filling apparatus of the kind described wherein there is provided in association with the nozzle a liquid supply control device comprising a tube adapted to depend into a container into which the nozzle is inserted for filling the container, first switching means adapted to be switched from one condition to another condition by insertion of the tube into the container, second switching means adapted to be switched to one condition from another condition by liquid rising to a predetermined level in said tube, said means for controlling the supply of liquid being associated with said first switching means and said second switching means so that said means for controlling the supply of liquid acts to prevent the supply of liquid through said nozzle when either said first switching means or said second switching means is in said one condition and to permit the supply of liquid through said nozzle only when both said first switching means and said second switching means are in said other position.

Preferably said first switching means and said second switching means are connected in series with each other.

The second switching means may be a pressure-operated switch which is switched between said one condition and said other condition by movement of a diaphragm which closes the upper end of the tube, the diaphragm moving with variations in the pressure acting within the tube on the diaphragm.

Conveniently said first switching means is carried by the tube, in which case insertion of the tube into the container may bring a movable actuating element of said first switching means into abutment with a fixed part of, or a part fixed to the container to move the movable actuating element against the action of a biassing load, movement of the movable actuating element switching said first switching means. Said fixed part may comprise a spigot secured in an opening in the container through which the tube is inserted, said spigot being arranged to engage in a socket in a switch housing carried by the tube. Conveniently the biassing load acting to bias the movable actuating element into the position it adopts when the first switching is in said one condition is a gravitational load.

The liquid supply control device may comprise a switch housing carrying said first switching means, said second switching means and said tube, a movable part of said first switching means projecting from the same surface of said switch housing as said tube and said movable actuating element comprising a substantially annular member which surrounds the tube and is hinged to the switching housing, the arrangement being such that by insertion of the tube into the container the substantially annular hinged actuating member is moved about its hinge axis into engagement with said surface of the switch housing and the movable part of said first switching means to switch said first switching means from said one condition to said other condition. Conveniently a bar may be provided which extends laterally from said substantially annular hinged actuating member so as to engage with that part of the container defining an opening which is larger than the substantially annular hinged actuating member and through which the tube is inserted. In such an arrangement the tube may be provided with a counterweight.

The liquid supply control device may be attached to the nozzle by flexible means so that it can be moved relative to the nozzle. Such flexible coupling between the liquid supply control device and the nozzle is desirable when the nozzle is carried at the end of a loading arm for filling the tank compartment of tank vehicles. This is because the positioning of the tank vehicle in relation to the loading arm is likely to vary considerably from one vehicle to another so that the angle of the loading arm in relation to the vertical when the nozzle is inserted into a tank compartment of the tank vehicle is likely to vary correspondingly. Consequently it might be difficult to locate the liquid supply control device in the desired position within a manhole leading to the tank compartment to be filled if the liquid supply control device were rigidly coupled to the loading arm. Conveniently the flexible means coupling the liquid supply control device to the nozzle are arranged so that the liquid supply control device is moved to withdraw the tube from the container when the nozzle is withdrawn from the container so that said switching means is switched from said other condition to said one condition and supply of liquid through said nozzle is prevented.

Said first and second switching means may be electric switches and said means for controlling the supply of liquid may be associated with said first and second switching means by being connected in an electric control circuit including said first and second electric switches. Alternatively said means for controlling the supply of liquid may be associated with said first and second switching means by a pneumatic circuit or a fluidic circuit.

According to another aspect of this invention, there is provided a container-filling apparatus of the kind described, wherein there is provided in association with the nozzle, a liquid supply control device comprising a tube adapted to depend into a container in which the nozzle is inserted for filling the container, a normally closed electric switch adapted to be operated by liquid rising to a predetermined level in said tube and a normally open electric switch, adapted to be closed by the insertion of the tube into the container, said switches being arranged in an electrical circuit associated with the electrically operated means, which circuit is so arranged that the supply of liquid is shut off by the opening of either one of the said switches, and is permitted only when both switches are closed.

If apparatus for filling a plurality of containers simultaneously includes for each container a container-filling apparatus of the kind described having in association with its liquid supply control means an overfill protection device, and if all the overfill protection devices are connected in series in a common control circuit, it will be appreciated that operation of an overfill prevention device associated with just one of the containers to prevent further liquid being supplied to that container will result in the prevention of liquid being supplied to all the containers being filled by the apparatus for filling all those containers simultaneously.

According to a feature of this invention, there is provided apparatus for filling a plurality of containers simultaneously, including a container-filling apparatus of the kind described in accordance with this invention for each of the plurality of containers, the electrical, pneumatic or fluidic circuits by which the means for controlling the supply of liquid of each container-filling apparatus of the kind described are associated with their corresponding first and second switching means being connected in parallel so that when a first or second switching means of one of the liquid supply control devices is switched to said one position, liquid may be supplied to the other containers by each of the other nozzles.

Embodiments of this invention will now be described by way of example only with reference to the accompanying drawings, of which:

FIG. 3 is a schematic diagram partly in section showing one embodiment of container-filling apparatus for filling a single container;

FIG. 4 is an elevation partly in section showing an alternative form of a liquid supply control device for use in container-filling apparatus for filling a single container;

FIG. 5 is a view on arrow A of FIG. 4; and

Figure 1:
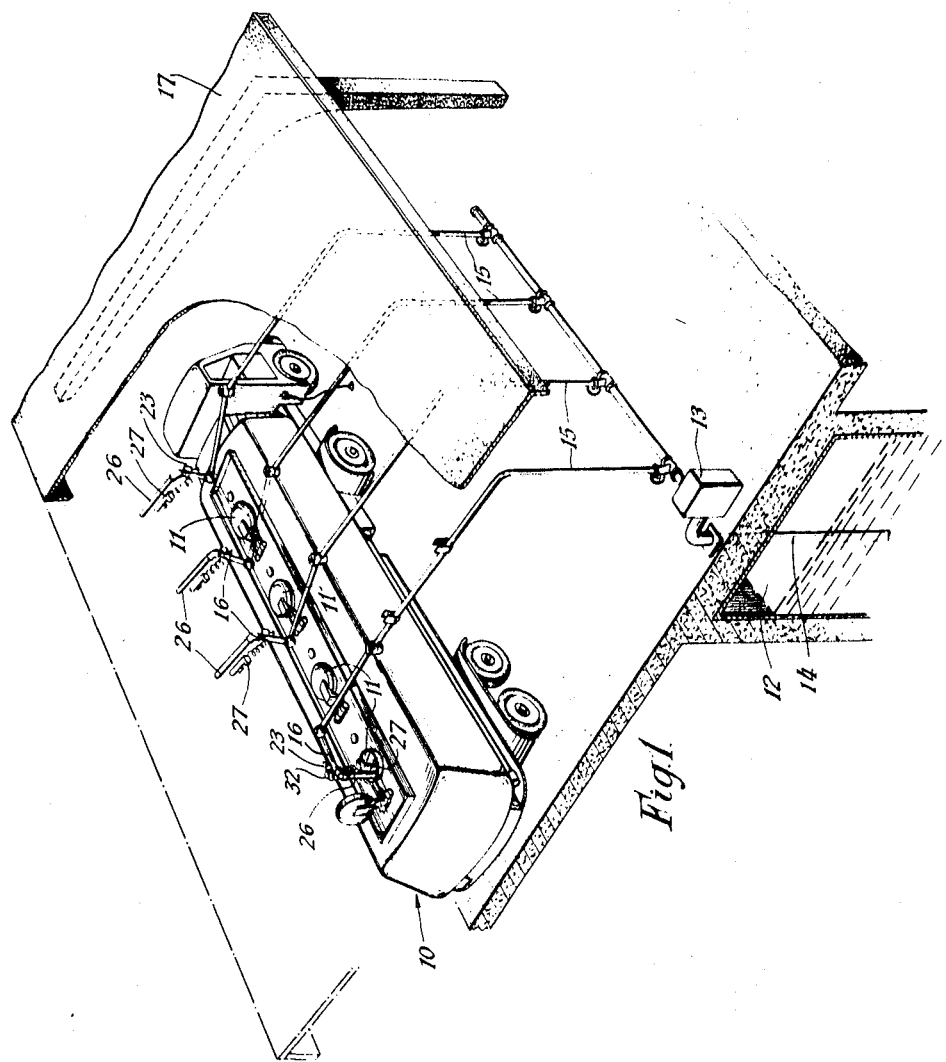
FIG. 1 is an illustration in perspective showing a tank vehicle positioned at a loading bay incorporating apparatus in accordance with this invention for filling four containers simultaneously.

Referring to FIG. 1, a tank vehicle 10 has four manholes 11 at the top. Each manhole 11 communicates with a corresponding compartment within the tank of the vehicle 10, each compartment being arranged to contain liquid hydrocarbon fuel.

The loading bay has an underground reservoir 12 for liquid hydrocarbon fuel, a pump 13 for drawing liquid hydrocarbon fuel from the reservoir 12 through a conduit 14 and for supplying such liquid hydrocarbon fuel through pipes 15 to four loading arms 16. Each loading arm 16 has a nozzle which is arranged to be inserted through a manhole 11 and a solenoid-operated control valve for controlling the supply of liquid hydrocarbon fuel through the nozzle into the container afforded by the corresponding tank compartment. The pipes 15 and the loading arms 16 are supported by a canopy structure 17. Although the canopy structure 17 herein shown supports four loading arms 16, there being one loading arm 16 for each tank compartment of the tank vehicle 10, it will be appreciated that the canopy structure 17 may support any suitable number of loading arms 16.

Figure 2:
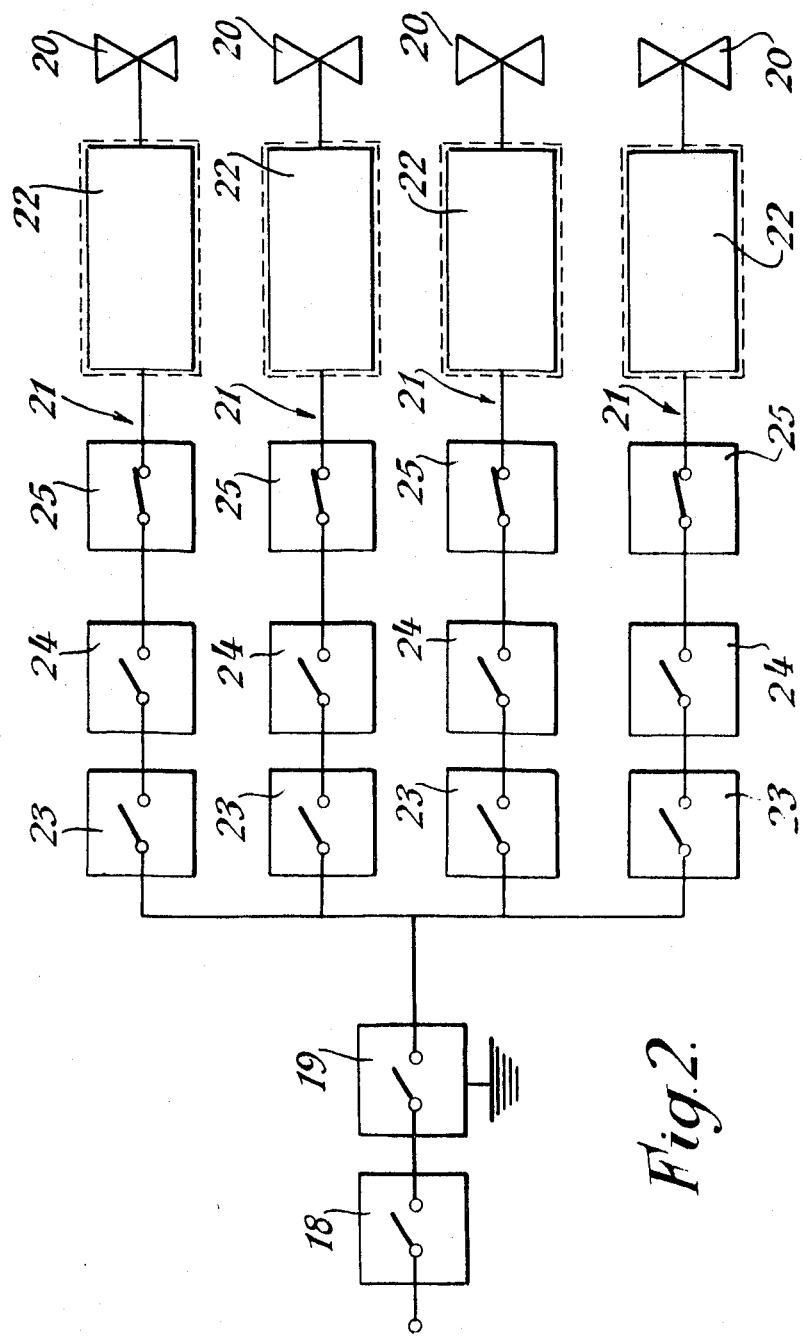
FIG. 2 is a diagram showing the arrangement of switches of an electrical control circuit suitable for use in the apparatus of FIG. 1 for filling four containers simultaneously.

Referring to FIG. 2, there is shown an electrical control circuit suitable for use as part of the loading bay illustrated in FIG. 1 and arranged to control operation of the solenoid operated control valves of each loading arm 16. The electrical circuit includes a normally open card reader operated switch 18 in series with a normally open switch 19 of an earthing interlock unit. The two switches 18 and 19 are connected in parallel with the four solenoid windings 20 of the four solenoid-operated control valves of the loading arms 16 through corresponding branch circuits 21 of the intrinsically safe type.

Each intrinsically safe branch circuit 21 includes electrical apparatus 22 in series with the solenoid winding 20. The electrical apparatus 22 forms no part of the present invention and includes a relay which in turn controls another relay in a higher voltage circuit to operate the solenoid-actuating device including the solenoid winding 20.

Each intrinsically safe branch circuit 21 includes three further switches 23, 24 and 25, which are connected electrically in series with each other and with the apparatus 22. The switch 23 is a normally open switch mounted on the loading arm 16. Operation of the switch 23, which may be a mercury switch or a gravity-operated switch, is controlled by the position of the loading arm 16, the switch 23 being closed only when the loading arm 16 is moved downwardly to insert the nozzle into a tank compartment of the tank vehicle 10. The switches 24 and 25 are part of an overfill prevention device associated with the nozzle of the loading arm 16. The overfill protection device will be described in detail hereinafter. The switch 24 is a normally open contact switch and the switch 25 is a normally closed pressure-operated switch.

The solenoid-operated control valve of each loading arm 16 is a shutoff valve which is arranged to be opened only when the three switches 23, 24 and 25 of the associated intrinsically safe branch circuit 21, and the two switches 18 and 19 are all closed.

The card reader incorporating the normally open card reader switch 18 and the earthing interlock unit incorporating the normally open switch 19 conveniently are mounted upon the canopy structure 17.

FIG. 3 illustrates a practical arrangement of the switches 23, 24 and 25 of one intrinsically safe branch circuit 21 in combination with a nozzle 26 carried at the end of a loading arm 16 and through which liquid hydrocarbon fuel may be supplied. The nozzle 26 is inserted through the corresponding manhole cover 11 of the tank vehicle 10 and has associated with it a liquid control device 27 comprising a switch housing 28 from which extends a tube 29 open at its end 30 remote from the switch housing 28. In use of the liquid supply control device 27, the tube 29 depends into the tank compartment into which the nozzle 26 is inserted and the device 27 is arranged with the open end 30 lowermost. The liquid supply control device 27 serves as the overfill protection device.

The liquid supply control device 27 is attached to the loading arm 16 only by flexible means comprising a length of cord 31 or other such tension member, the cord 31 conveniently being formed of a synthetic plastics material, and an extensible electrical cable 32 which provides the electrical connection between the loading arm switch 23 and the two switches 24 and 25 which are located within the switch housing 28. The arrangement of the flexible tension member 31 and the extensible electrical cable 32 is such that the liquid supply control device 27 will be withdrawn from its operational position within the manhole 11 with withdrawal of the nozzle 26 therefrom, while the liquid supply control device 27 can be moved relative to the nozzle 26 or the loading arm 16.

The pressure operated switch 25 is located within the switch housing 28 near to the top end of the tube 29 and has an actuating arm 33 on its side nearest to the tube 29. The upper end of the tube 29 is closed by a diaphragm 34 of flexible material and a pin 35 projects towards the pressure switch 25 from the diaphragm 34. A socket 36 is formed in the face of the switch housing 28 from which the tube 29 projects. The normally open contact switch 24 is located within the switch housing 28 with its actuating element 37 projecting into the inner end of the socket 36. An L-shaped member 38 is secured to the peripheral wall of the manhole 11 with its limb remote from the peripheral wall projecting upwardly. The upwardly projecting limb of the L-shaped member 38 affords a spigot which is arranged to be spigoted into the socket 36 of the switch housing 28 so as to move the actuating member 37 of the contact switch 24 upwardly to close the contact switch 24.

In order to fill the tank compartment of the tank vehicle 10 with which the manhole 11 illustrated in FIG. 3 communicates, the loading arm 16 associated with the manhole 11 is lowered to insert the nozzle 26 carried by the loading arm 16 through the manhole 11. Lowering of the loading arm 16 closes the contacts of the loading arm switch 23. The liquid supply control device 27 is inserted into the manhole 11, being positioned in its operational position by engagement of the spigot limb of the L-shaped member 38 within the cooperating socket 36 to close the contacts of the contact switch 24. Thus, all the switches of the associated intrinsically safe branch circuit 21 are closed and once the card reader switch 18 and the switch 19 of the earthing interlock unit have been closed by appropriate operation by the operator, current is supplied to energize the solenoid winding 20 and thus to open the solenoid-operated shutoff valve and to allow liquid to be supplied through the nozzle 26 into the tank compartment of the tank vehicle 10 associated with the manhole 11.

Normally, the supply of liquid through the nozzle 26 will be shut off by a present device (not shown), or by opening of the loading arm switch 23 due to removal of the nozzle 26 from the manhole 11. It will be appreciated that due to the tension member 31 coupling the liquid supply control device 27 to loading arm 16, the upward movement of the loading arm 16 to remove the nozzle 26 from the manhole 11 will carry the liquid supply control device 27 with it thus disengaging the upwardly projecting limb of the L-shaped member 38 from the cooperating socket 36 of the switch housing 28 and releasing the contact closing load applied thereby to the actuating member 37 of the contact switch 24 so that the contacts of the contact switch 24 open. Once the contacts of either the switch 23 or the switch 24 are opened, the solenoid winding 20 will be deenergized and the solenoid-operated cutoff valve controlling the supply of liquid to the nozzle 26 will be closed so that no further liquid will be supplied through the nozzle 26.

If, due to an error in setting of the preset device, or for any other reason, delivery of liquid hydrocarbon fuel continues until the level of liquid hydrocarbon fuel in the tank compartment with which the manhole 11 communicates, is higher than is desired, the overfill protection device operates to shut off the supply of liquid hydrocarbon fuel. When liquid hydrocarbon fuel submerges the lower end 30 of the dependent tube 29 of the liquid supply control device 27, pressure is built up within the tube 29 and, when the level of liquid within the tube 29 reaches a predetermined maximum level, the pressure within the tube 29 will increase to such an extent that the corresponding deflection upwardly of the flexible diaphragm 34 will bring the probe 35 into engagement with the actuating arm 33 of the pressure operated switch 25 to apply a contact opening load to the actuating arm 33 and thus to open the contacts of the normally closed pressure operated switch 25. It will be appreciated from the electrical circuit of FIG. 2 that opening of the contacts of the pressure-operated switch 25 will break the circuit 21 and thus deenergize the solenoid winding 20 so that the supply of liquid hydrocarbon fuel to the nozzle 26 will be shut off by closure of the solenoid-operated shut off valve. The sequence of operations just described of the branch circuit 21 does not affect the operation of the other branch circuits 21 of the arrangement illustrated diagrammatically in FIG. 2. Therefore the supply of liquid hydrocarbon fuel will be shut off only to the tank compartment or compartments where the above sequence of operations have taken place in the associated branch circuit 21.

Referring to FIGS. 4 and 5, there is illustrated a modified form of liquid supply control device 40 which may be used in place of the liquid supply control device 27 of the embodiment described above with reference to FIG. 3. The liquid supply control device 40 may conveniently be made of a plastics material and is designed for use in combination with the dip stick orifice with which each tank compartment of a tank vehicle 10 usually is provided. The liquid supply control device 40 comprises a switch housing 39 containing the pressure-operated switch 25 and the contact switch 24. The pressure-operated switch 25 is located at the top of a sensing tube 29 of plastics material (such as a rigid unplasticized polyvinylchloride) or of any other suitable material and is arranged to be operated by deflection of a diaphragm 34 closing the top end of the tube 29 in a similar manner to the arrangement of the embodiment illustrated in FIG. 3.

The contact switch 24 is arranged so that its actuating member 37 projects from the same surface of the switch housing 39 as does the dependent tube 29. An annular member 41 having a radial gap 42 is hinged at 43 in the region of the radial gap 42 to the surface of the switch housing 39 from which the actuating member 37 and the tube 29 project.

The annular member 41 surrounds the tube 29. Normally the weight of the annular member 41 holds its end diametrically opposite the hinge 43 spaced from the switch housing 39 due to the action of gravity so that the annular member 41 is not in contact with the actuating member 37 of the contact switch 24.

In use of the liquid supply control device 40, when the associated nozzle 26 is inserted through a manhole 11 into a tank compartment, the tube 29 of the liquid supply control device 40 is inserted through the dip stick orifice communicating with the same tank compartment and the liquid supply control device 40 is supported on the structure surrounding the dip stick orifice. The annular member 41 is held in engagement with the underside of the switch housing 39 and with the actuating member 37 of the contact switch 24 due to the action of the weight of the liquid supply control device 40 and the reaction of the structure upon which it is supported. Thus a contact closing load is applied to the actuating member 37. The operation of the container-filling apparatus comprising the associated loading arm 16, the nozzle 26 and the liquid supply control device 40 is the same in principle to that of the arrangement described above with reference to FIG. 3.

Figure 6:
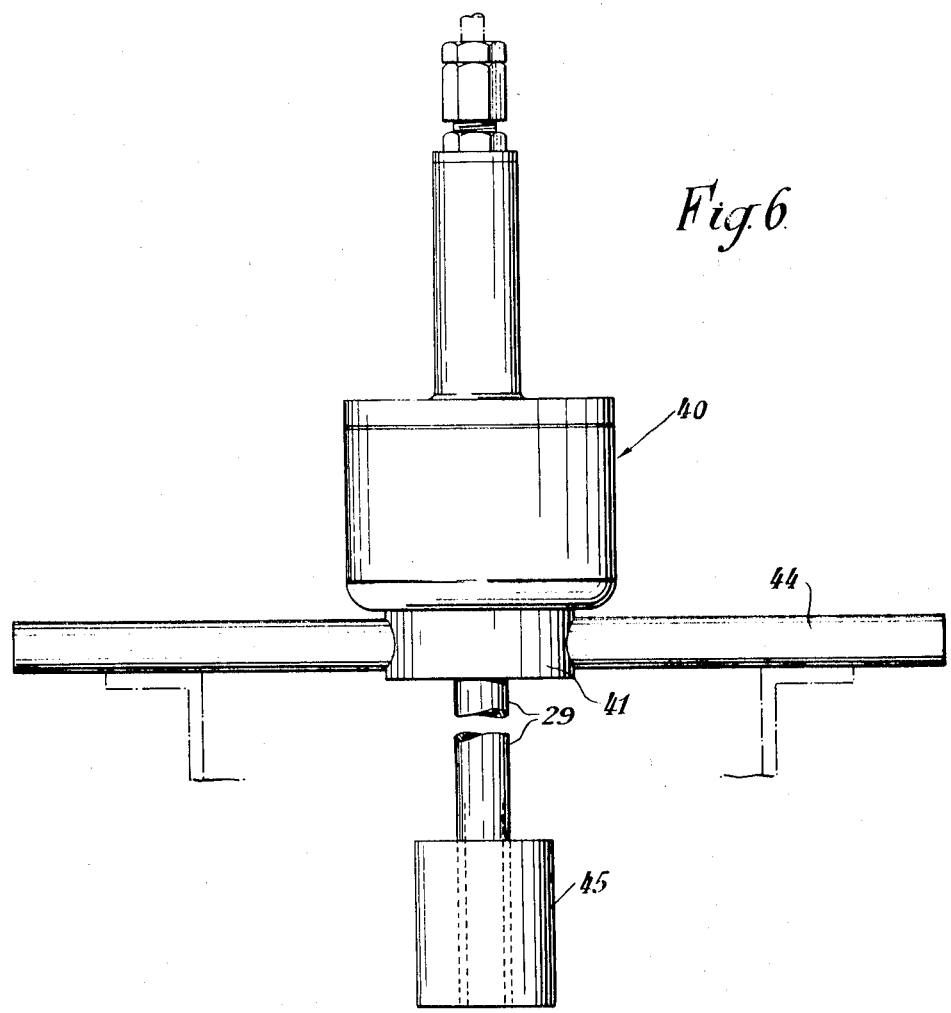
FIG. 6 is a side view of a modification of the liquid supply control device of FIGS. 4 and 5.

If it is desired to insert the tube 29 of a liquid supply control device 40 through an orifice which is larger in diameter than the outside diameter of the annular member 41, a laterally extending support rod 44 may be provided extending laterally from the annular member 41 as shown in FIG. 6, so as to engage the structure surrounding the orifice through which the tube 29 is to be inserted. In such an arrangement a counterweight 45 may be secured to the tube 29 so as to hold the axis of the tube 29 vertical.

Various modifications or refinements of the embodiments of this invention described above may be incorporated without departing from the scope of this invention. For example, although the contact switches have been described as being actuated mechanically, they may be gravity operated or they may comprise magnetic switches. Although the control circuit controlling operation of the shut off valves carried by the loading arms 16 to control the supply of liquid hydrocarbon fuel through the nozzles 26 are described as being electrical circuits, they may be pneumatically operated control circuits or fluidic control circuits as desired. If the tank vehicle is not provided with suitably positioned L-shaped members 38 in each manhole 11, such an L-shaped member 38 may be secured in position in the manhole 11 for the duration of the filling operation by the operator to enable the tank compartment to be filled by apparatus incorporating the liquid supply control device 27 described with reference to FIG. 3. The L-shaped member 38 may be secured in position temporarily by any suitable means, e.g., magnetic or mechanically operated clamping arrangements, or by being supported by a suspension support hooked to the top peripheral surface of the manhole 11. The reservoir 12 may comprise any suitable storage tank which may be located in any convenient position above or below ground level.

We claim:

1. Container-filling apparatus including a nozzle adapted to be inserted through a manhole in a container to be filled, means for supplying liquid through said nozzle, and means for controlling the supply of liquid through said nozzle, wherein there is provided in association with the nozzle a liquid supply control device which is separate from and movable relative to the nozzle, the liquid supply control device comprising a tube adapted to depend into a container into which the nozzle is inserted for filling the container, first switching means adapted to be switched from one condition to another condition by insertion of the tube into the container, second switching means adapted to be switched to one condition from another condition by liquid rising to a predetermined level in said tube, said means for controlling the supply of liquid being associated with said first switching means and said second switching means so that said means for controlling the supply of liquid acts to prevent the supply of liquid through said nozzle when either said first switching means or said second switching means is in said one condition and to permit the supply of liquid through said nozzle only when both said first switching means and said second switching means are in said other condition.

2. Container-filling apparatus as claimed in claim 1, wherein said first switching means and said second switching means are connected in series with each other.

3. Container-filling apparatus as claimed in claim 1, wherein said second switching means is a pressure operated switch.

4. Container-filling apparatus as claimed in claim 3, including a diaphragm which closes the upper end of the tube, said second switching means being switched between said one condition and said other condition by movement of the diaphragm with variation of pressure acting within the tube on the diaphragm.

5. Container-filling apparatus as claimed in claim 1, wherein said first switching means is carried by the tube.

6. Container-filling apparatus as claimed in claim 1, wherein insertion of the tube into the container brings a movable actuating element of said first switching means into abutment with a fixed part of, or a part fixed to the container to move the movable actuating element against the action of a biasing load, movement of the movable actuating element switching said first switching means.

7. Container-filling apparatus as claimed in claim 6, wherein said fixed part comprises a spigot secured in an opening in the container through which the tube is inserted, said spigot being arranged to engage in a socket in a switch housing carried by the tube.

8. Container-filling apparatus as claimed in claim 6, wherein the biasing load acting to bias the movable actuating element into the position it adopts when said first switching means is in said one condition is a gravitational load.

9. Container-filling apparatus as claimed in claim 8, wherein said liquid supply control device comprises a switch housing carrying said first switching means, said second switching means and said tube, a movable part of said first switching means projecting from the same surface of said switch housing as said tube, and said movable actuating element comprising a substantially annular member which surrounds the tube and is hinged to the switch housing, the arrangement being such that by insertion of the tube into the container the substantially annular hinged actuating member is moved about its hinge axis into engagement with said surface of the switch housing and the movable part of said first switching means to switch said first switching means from said one condition to said other condition.

10. Container-filling apparatus as claimed in claim 9, including a bar which extends laterally from said substantially annular hinged actuating member so as to engage with that part of the container defining an opening which is larger than the substantially annular hinged actuating member and through which the tube is inserted.

11. Container-filling apparatus as claimed in claim 10, wherein the tube is provided with a counter weight.

12. Container-filling apparatus as claimed in claim 1, wherein said liquid supply control device is attached to the nozzle by flexible means so that it can be moved relative to the nozzle.

13. Container-filling apparatus as claimed in claim 12, wherein the flexible means are arranged so that the liquid supply control device is moved to withdraw the tube from the container when the nozzle is withdrawn from the container so that said first switching means is switched from said other condition to said one condition and the supply of liquid through said nozzle is prevented.

14. Container-filling apparatus as claimed in claim 1, wherein said first and second switching means are electric switches and said means for controlling the supply of liquid is associated with said first and second electric switches by being connected in an electrical control circuit including said first and second electric switches.

15. Container-filling apparatus as claimed in claim 1, wherein said means for controlling the supply of liquid is associated with the said first switching means and said second switching means by a pneumatic circuit.

16. Container-filling apparatus, wherein there is provided in association with the nozzle, a liquid supply control device comprising a tube adapted to depend into a container in which the nozzle is inserted for filling the container, a normally closed electric switch adapted to be operated by liquid rising to a predetermined level in said tube, and a normally open electric switch adapted to be closed by the insertion of the tube into the container, said switches being arranged in an electrical circuit associated with the electrically operated means, which circuit is so arranged that the supply of liquid is shut off by the opening of either one of the said switches, and is permitted only when both switches are closed.

17. Apparatus for filling a plurality of containers simultaneously including a container-filling apparatus in accordance with claim 16 for each of the plurality of containers, the electrical, circuits by which the means for controlling the supply of liquid of each container-filling apparatus are associated with their corresponding first and second switching means being connected in parallel so that when one of said first and second switching means of one of the liquid supply control devices is switched to said one condition, liquid may be supplied to the other containers by each of the other nozzles.

18. Container-filling apparatus as claimed in claim 1 wherein said means for controlling the supply of liquid is associated with the said first switching means and said second switching means by a fluidic circuit.

* * * * *